United States Patent [19]
Sakano et al.

[11] Patent Number: 5,796,193
[45] Date of Patent: Aug. 18, 1998

[54] DISK DRIVING MOTOR

[75] Inventors: Hiromichi Sakano; Shouichi Saito, both of Hachioji, Japan

[73] Assignee: Olympus Optical Co., Ltd., Japan

[21] Appl. No.: 595,775

[22] Filed: Feb. 2, 1996

[30] Foreign Application Priority Data

Feb. 15, 1995 [JP] Japan ................... 7-026611

[51] Int. Cl.$^6$ ............... H02K 1/22; H02K 21/12
[52] U.S. Cl. ............ 310/67 R; 310/103; 310/268; 310/266; 310/114; 310/156; 360/99.03; 360/99.07; 360/99.12; 360/97.01; 369/270; 369/271
[58] Field of Search ............ 310/67 R, 268, 310/114, 266, 103; 360/97.01, 99.01, 99.03–99.05, 99.07–99.08, 99.12; 369/270, 271, 261, 266

[56] References Cited

U.S. PATENT DOCUMENTS

| | | | |
|---|---|---|---|
| 3,845,339 | 10/1974 | Merkle et al. | 310/156 |
| 4,401,419 | 8/1983 | Rabe | 417/415 |
| 4,874,976 | 10/1989 | Ohsawa et al. | 310/268 |
| 4,987,333 | 1/1991 | Noguchi et al. | 310/268 |
| 5,128,818 | 7/1992 | Koizumi et al. | 360/99.04 |
| 5,153,470 | 10/1992 | Miyaji et al. | 310/67 R |
| 5,254,895 | 10/1993 | Koizumi | 310/156 |
| 5,453,650 | 9/1995 | Hashimoto et al. | 310/268 |

FOREIGN PATENT DOCUMENTS

| | | | |
|---|---|---|---|
| 1-64165 | 3/1989 | Japan | 310/268 |
| 7-312015 | 11/1995 | Japan | 310/67 R |

Primary Examiner—Thomas M. Dougherty
Assistant Examiner—Karl Tamai
Attorney, Agent, or Firm—Ostrolenk, Faber, Gerb & Soffen, LLP

[57] ABSTRACT

A rotor is formed by a rotary frame 3 composed of a nonmagnetic material, a field magnet 5, a yoke 4 and an auxiliary yoke 7. A disk 12 is mounted on the rotary frame 3. An opening 4b is formed in the yoke 4 to thereby cause attractive magnetic flux from the field magnet 5 to effectively act on a clamping yoke 13 of the disk, so that the disk 12 can be firmly clamped. The yoke 4 covers the circumferential part of the field magnet 5 on its disk 12 side to thereby cut off magnetic flux leakage toward the disk 12, so that its adverse effect on the recording surface of the disk 12 can be avoided. The auxiliary yoke 7 so arranged that a stator coil 6 is interposed between the auxiliary yoke 7 and the field magnet 5 is secured to the rotary frame 3 to thereby increase effective rotating magnetic flux so that output torque is increased.

3 Claims, 3 Drawing Sheets

DISK DRIVING MOTOR

BACKGROUND OF THE INVENTION

1. Field of the Invention

The present invention relates to a disk driving motor capable of driving a disk for use in magnetic recording or magneto-optical recording. More particularly, the present invention is concerned with a disk driving motor which not only magnetically attracts the disk but also has the circumferential part of the field magnet producing rotating magnetic field covered by a yoke so that magnetic flux leakage can be cut off to thereby enable avoiding its adverse effect on the recording surface of the disk and thus to enable performing desirable information recording.

2. Discussion of Related Art

FIG. 4 shows the conventional disk driving motor described in Japanese Patent Application Laid-Open Specification No. 64165/1989. Two bearings 22 are secured inside the boss part of the shield member 21 on its stator side which also acts as a motor mounting frame. A rotary shaft 23 is rotatably secured to the shield member 21 through the bearings 22. A rotary frame 39 composed of a nonmagnetic material is firmly secured to the rotary shaft 23 by means of an adhesive applied to the channel 23a of the rotary shaft 23. This rotary frame 39 is adapted to detachably support the disk 34 as a recording medium. This support of the disk 34 is effected by fitting the rotary shaft 23 in the hole 36a open in the center of the clamping yoke 36 of a magnetic material provided in the center of the disk to thereby achieve positioning thereof and by magnetically attracting the clamping yoke 36. Numeral 26 denotes a field magnet disposed on one side of the rotary frame 39 along its circumference and adapted to conduct the magnetic attraction, which field magnet has the shape of a ring and is magnetized so that a given number of magnetic poles are formed along the circumference, namely, magnetization of S and N poles is carried out in the direction of the thickness in a manner such that the magnetized region is divided along the circumference into a plurality of sections and that the magnetic pole of every section is opposite to that of the neighboring section. The field magnet 26 not only conducts magnetic attraction of the disk 34 but also serves formation of rotating magnetic field. The rotating magnetic field is realized by passing electric current through the stator coil 38 disposed opposite to the field magnet 26. This stator coil 38 is composed of flat armature coils individually wound in approximately sectorial form and arranged at equal pitches along the circumference around the rotary shaft 23. The stator coil 38 is fixed on the circuit board 29 having control circuit secured to the shield member 21. Numeral 28 denotes a hole element for detecting the position of magnetic pole of the field magnet 26, which hole element is mounted on the circuit board 29.

In the above structure, when the rotary shaft 23 is fitted with the disk 34, the field magnet 26 magnetically attracts the disk yoke 36, so that the disk is secured to the rotary frame 39. In this state, passing electric current through the stator coil 38 generates rotating magnetic field between the stator coil 38 and the field magnet 26, so that the rotary frame 39 is rotated simultaneously with the rotary shaft 23 to thereby rotate the disk 34.

In the above motor of the conventional structure, the magnetic path of the field magnet 26 adapted to magnetically attract the disk 34 runs through the rotary frame 39 composed of a nonmagnetic material. This structure suffers from magnetic flux leakage from the magnetic path, which cannot be cut off. The magnetic flux leakage adversely affects the recording surface of the disk 34 and deteriorates the reliability of magnetic or magneto-optical recording.

When it is intended to attain a thickness reduction and a torque increase with respect to the conventional structure, a magnet of high energy product such as a neodymium magnet would be used as the field magnet 26 so that a thickness reduction and a torque increase can be realized on the field magnet 26. However, the problem is encountered that the field magnet 26 has high attractive force, so that an extremely large clamping force applies to the clamping yoke 36 of the disk 34 because the clamping yoke 36 faces substantially all the surface of the field magnet 26 with the result that not only is a high strength required for the release of the clamping but also a grave impact applies at the time of mounting of the disk 34. If the clamping force is optimized by decreasing the diameter of the clamping yoke 36 of the disk 34 in order to cope with the above problem, this would increase magnetic flux leakage toward the recording surface of the disk 34 to thereby adversely affect information recording.

Moreover, the conventional motor encounters the problem that an eddy current is generated in the shield member 21 because of the repetition of magnetic pole change caused by the rotation of the field magnet 26, so that the motor efficiency is gravely deteriorated at the time of high-speed rotation. Further, disadvantageously, the stator coil 38 is a coil fabricated by wire winding, so that the increase of the diameter thereof is accompanied by swelling out or mounting part enlargement to thereby disenable miniaturization.

SUMMARY OF THE INVENTION

The present invention has been made taking the above circumstances into account.

It is an object of the present invention to provide a disk driving motor in which not only are the rotary driving force and the disk clamping force held appropriate but also the leakage of magnetic flux toward the recording surface of the disk is minimized to thereby enable reliable recording and further enable reduction of the thickness of the whole body.

It is another object of the present invention to improve the driving efficiency and to minimize the vibration attributed to the reaction to the stator coil with respect to the above disk driving motor.

It is a further object of the present invention to enable an increase of the output torque with respect to the above disk driving motor.

The foregoing and other objects, features and advantages of the present invention will become apparent from the following detailed description and appended claims taken in connection with the accompanying drawings.

DETAILED DESCRIPTION OF THE INVENTION

Figure 1:
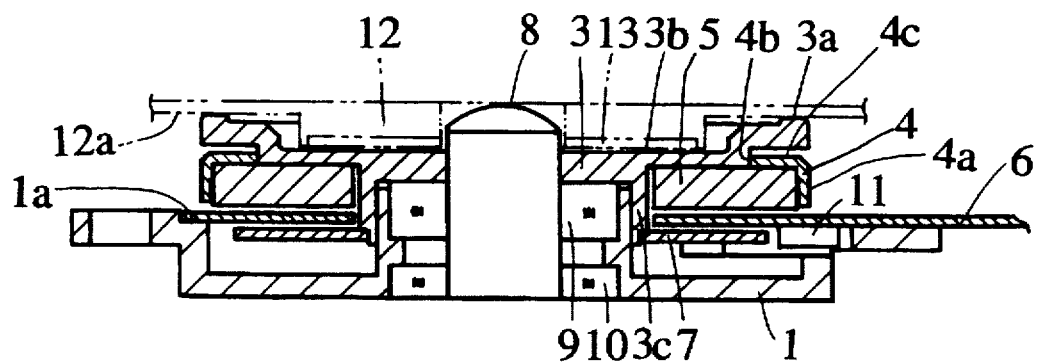
FIG. 1 is a sectional view showing one embodiment of the present invention, which corresponds to a section on the line A—A of FIG. 2.

For attaining the above objects, according to the present invention, there is provided a disk driving motor comprising:

a stator coil secured to a bracket, a rotary shaft rotatably secured to the bracket and a rotor secured to the rotary shaft and adapted to rotate simultaneously with the rotary shaft, wherein the rotor comprises:

a rotary frame composed of a nonmagnetic material and adapted to detachably support a disk having a clamping yoke, a field magnet having a diameter larger than that of the clamping yoke of the disk, the field magnet arranged on the rotary frame so as not only to apply clamping magnetic force to the clamping yoke of the disk but also to position opposite to the stator coil to thereby produce rotating magnet field between the field magnet and the stator coil and a yoke composed of a magnetic material, having an opening provided at a part corresponding to the clamping yoke of the disk and covering the field magnet at its circumferential part on the disk side.

In this structure, the field magnet of the rotor magnetically attracts the clamping yoke of the disk through the rotary frame composed of a nonmagnetic material. The magnetic circuit adapted to conduct this magnetic attraction passes through the rotary frame. However, the circumferential part of the field magnet on its disk side is covered by a yoke composed of a magnetic material, so that the magnetic flux leakage toward the recording surface of the disk can be cut off. Therefore, the adverse effect of the leaked magnetic flux on the recording surface of the disk can be avoided. In this structure, the yoke has an opening provided opposite to the clamping yoke of the disk, so that the distance between the field magnet and the clamping yoke of the disk becomes small with the result that the magnetic flux for magnetic attraction favorably acts on the clamping yoke to thereby enable clamping of the disk with a suitable clamping force.

In the above disk driving motor, it is preferred that the rotary frame of the rotor be provided with an auxiliary yoke so that the stator coil is interposed between the auxiliary yoke and the field magnet. The auxiliary yoke increases the effective magnetic flux from the magnetic circuit for rotation to thereby enhance the driving efficiency. Further, the auxiliary yoke is rotated simultaneously with the field magnet, so that there is no magnetic pole change due to rotation. Therefore, no eddy current is generated to thereby further enhance the efficiency.

In the above disk driving motor, further, it is preferred that the stator coil be shaped into a plate, part or all of which has a diameter larger than the outer diameter of the field magnet of the rotor. The fabrication of the stator coil from a platy sheet coil not only reduces the thickness thereof but also facilitates the fixing thereof on the bracket. Further, the size increase of this stator coil over the field magnet and the extension of a linear part along the axial direction enable an increase of the rotating torque.

EFFECT OF THE INVENTION

The disk driving motor of the present invention not only magnetically attracts the disk but also has the circumferential part of the field magnet producing rotating magnetic field covered by a yoke so that magnetic flux leakage can be cut off to thereby enable avoiding its adverse effect on the recording surface of the disk and thus to enable performing desirable information recording. Further, the magnetic attraction of the disk is performed through the opening provided in the yoke, so that the disk can be firmly clamped.

In the present invention, providing the rotary frame with the auxiliary yoke 7 so that the stator coil is interposed between the auxiliary yoke and the field magnet not only inhibits the generation of an eddy current but also increases the effective magnetic flux for rotary driving to thereby enhance the driving efficiency. Further, the employment of a stator coil having a diameter larger than that of the driving field magnet, whose linear part along the axial direction is extended, enables an increase of the rotating torque.

PREFERRED EMBODIMENT OF THE INVENTION

The present invention will now be described in greater detail with reference to the following Example, which should not be construed as limiting the scope of the invention.

Figure 2:
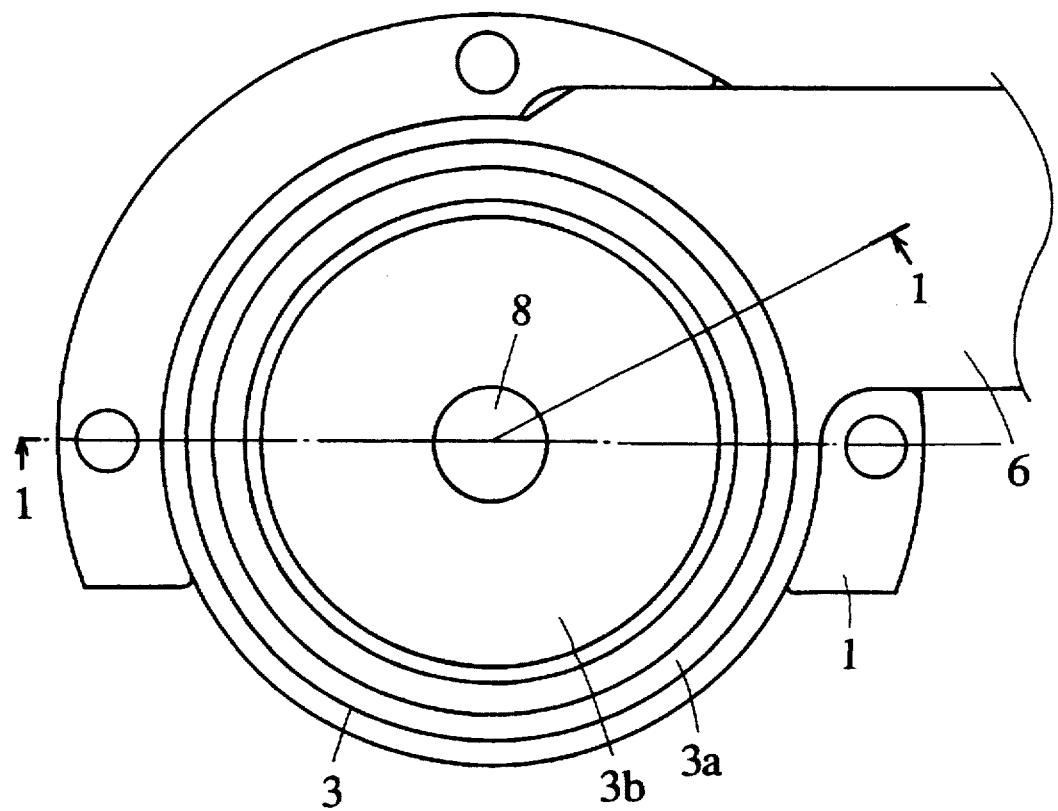
FIG. 2 is a plan of the motor whose section is shown in FIG. 1.

FIGS. 1 and 2 show one embodiment of the present invention. This disk driving motor is provided with a stator coil 6 secured to a bracket 1 composed of a nonmagnetic material, a rotary shaft 8 rotatably secured to the bracket 1 through bearings such as ball bearings 9, 10 secured inside a boss part of the bracket 1 and a rotor secured to the rotary shaft 8 and adapted to rotate simultaneously with the rotary shaft 8. The rotor consists of a rotary frame 3 composed of a nonmagnetic material, extending in the direction perpendicular to the rotary shaft 8 and secured to the rotary shaft 8, a field magnet 5 arranged on the rotary frame 3, a yoke 4 partially covering the field magnet 5 and an auxiliary yoke 7 secured to the rotary frame 3. The field magnet 5 has the shape of a ring and is divided into a plurality of sections. Each section is magnetized so that S and N poles alternately neighbor each other. The magnetization is carried out in the direction of the thickness of the field magnet 5.

The stator coil 6 is formed of a platy sheet coil, one edge (left edge) of which abuts on a stage part 1a provided on the bracket 1 by recessing it and is bonded to the bracket 1. In this arrangement, the stator coil 6 can be adapted to have a height level with the upper face of the bracket 1, so that the thickness of the motor can be reduced. A hole element 11 is mounted on the lower face of the stator coil 6 composed of the sheet coil. This renders unnecessary a circuit board for mounting the hole element 11, thereby enabling a further reduction of the thickness of the motor.

The whole of the rotary frame 3 of the rotor is composed of a nonmagnetic material. A disk 12 as an information recording medium is mounted on the upper surface of the rotary frame 3. For mounting the disk 12, a circular clamp protrusion 3a is formed at the circumferential part of the rotary frame 3. The lower face of the disk 12 is brought into contact with the clamp protrusion 3a. A stagewise lowered flat part 3b is formed extending from the clamp protrusion 3a to an inner boundary. The clamping yoke 13 of the disk 12 is disposed so as to face this flat part 3b.

The field magnet 5 of the rotor not only magnetically attracts the clamping yoke 13 of the disk 12 supported by the rotary frame 3 but also produces magnetic field for rotary driving between the field magnet 5 and the stator coil 6. A rare earth magnet of high energy product such as a neodymium magnet is employed as this field magnet 5. Therefore, even if the thickness of the field magnet 5 is reduced to thereby effect a volume decrease, it generates magnetic flux in an amount equal to or greater than those from other magnets, for example, a ferrite magnet, so that the stator coil 6 is acted on to thereby enable obtaining a satisfactory torque. Further, the diameter of the field magnet 5 is larger than that of the clamping yoke 13 of the disk 12, so that part of the field magnet 5 on its inner diameter side faces the clamping yoke 13 to thereby attract the clamping yoke 13.

Thus, the clamping yoke 13 is not attracted by the entirety of the field magnet 5 as different from the conventional motor, so that an excessively large attractive force can be avoided to thereby ensure maintenance of an appropriate attraction. Still further, the magnetic flux leakage from the field magnet 5 is cut off by the yoke 4 as described later, so that, even if a rare earth magnet which generates large magnetic flux is employed, the adverse effect of the magnetic flux leakage can be avoided.

As apparent from the above, in this embodiment, a high-energy magnet is employed as the field magnet 5 and its diameter is set larger than that of the clamping yoke 13, thereby enabling not only reduction of the thickness of the field magnet 5, namely, the thickness of the whole motor structure but also maintenance of a suitable clamping force. Moreover, the generated torque is increased by increasing the diameter of the field magnet 5, viz., the area of the part thereof opposite to the stator coil 6.

The yoke 4 of the rotor is composed of a cup-shaped magnetic material having an opening 4b at its inner part. The rotary frame 3 made of a nonmagnetic material is fitted in the opening 4b of the yoke 4 and the field magnet 5 is secured to the lower side of the rotary frame 3. This yoke 4 is fixed on the field magnet 5 by means of an adhesive so as to cover the circumferential part of the field magnet 5 on its disk 12 side. Numeral 4c denotes a first cover part covering the surface of the circumferential part of the field magnet 5 on its disk 12 side, and numeral 4a denotes a second cover part disposed so as to extend vertically downward continuously from the first cover part 4c, which second cover part covers the edge of the circumferential part of the field magnet 5. The magnetic flux leakage from the field magnet 5 toward the recording surface of the disk 12 can be cut off by virtue of these first and second cover parts 4c, 4a.

In the above structure, the magnetic flux from the field magnet 5 which magnetically attracts the clamping yoke 13 of the disk 12 passes through the opening 4b of the yoke 4 and through the rotary frame 3 composed of a nonmagnetic material to thereby reach the clamping yoke 13. In this instance, the magnetic flux passes through the flat part 3b having reduced thickness of the rotary frame 3 to reach the clamping yoke 13, so that the disk 12 can be clamped with desirable attractive force. Moreover, the first and second cover parts 4c, 4a of the yoke 4 cover the circumferential part of the field magnet 5, so that the magnetic flux leaked from the field magnet 5 toward the disk 12 is completely cut off by the yoke 4 with the result that not only is its adverse effect on the recording surface 12a of the disk 12 avoided to thereby ensure reliable recording but also the effective magnetic flux for driving can be increased.

Referring to FIG. 1, numeral 3c denotes a cylindrical part provided so as to extend from the rotary frame 3 in the axial direction of the rotary shaft 8. This cylindrical part has a length extending below the stator coil 6. An auxiliary yoke 7 composed of a magnetic material is fixed on the lower end of the cylindrical part 3c. The auxiliary yoke 7 extends from the cylindrical part 3c in the direction perpendicular to the rotary shaft 8 and the stator coil 6 is interposed between the auxiliary yoke 7 and the field magnet 5. The auxiliary yoke 7 rotates simultaneously with the rotary frame 3. The arrangement of this auxiliary yoke 7 further increases the effective magnetic flux for rotor rotating magnetic field. That is, the magnetic flux generated by the N pole of the field magnet 5 constitutes a magnetic loop in which the generated magnetic flux interlinks with the stator coil 6, reaches the auxiliary yoke 7, passes through the auxiliary yoke 7, again interlinks with the stator coil 6 and returns to the S pole of the field magnet 5. The above magnetic flux generates rotor driving force in cooperation with the current flowing through the stator coil 6. The distance between the field magnet 5 and the auxiliary yoke 7 is reduced by the use of the thin stator coil 6 interposed therebetween with the result that the magnetic flux is increased. Therefore, not only is the driving force increased but also the driving efficiency is enhanced. Moreover, the auxiliary yoke 7 rotates simultaneously with the field magnet 5 and the relative position thereof to the field magnet 5 does not change. Consequently, no magnetic pole change occurs, so that no eddy current is generated with the result that the driving efficiency of the motor as a whole is further enhanced.

Figure 3:
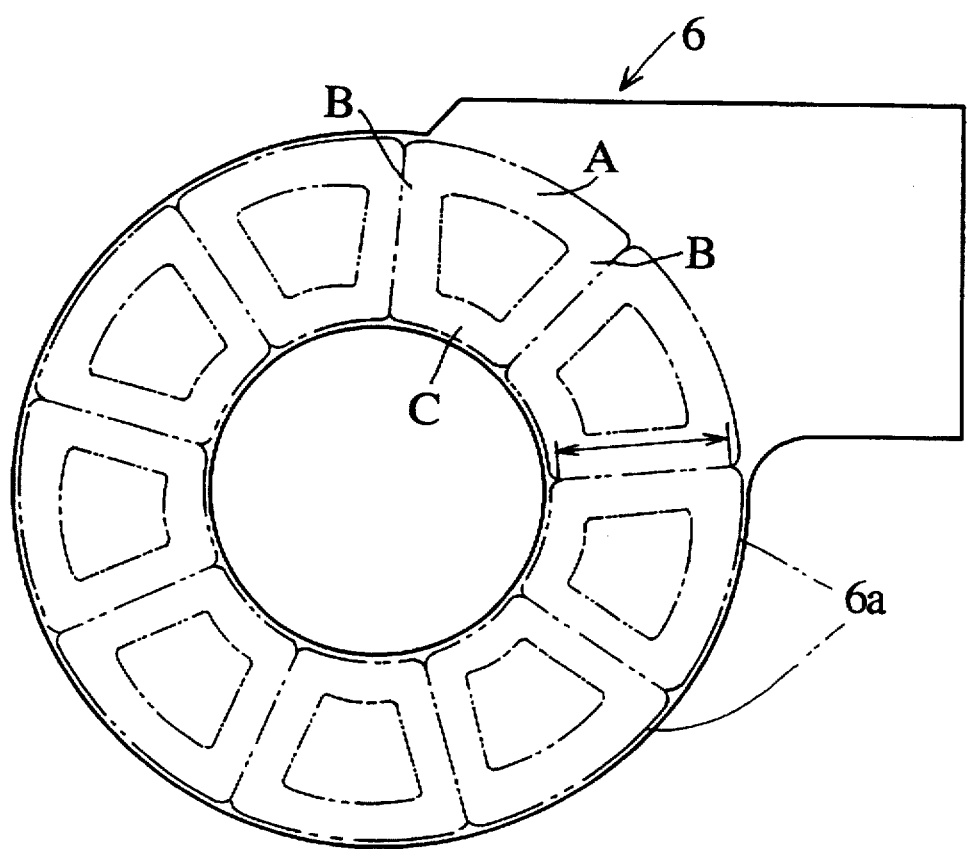
FIG. 3 is a plan of a stator coil.
Figure 4:
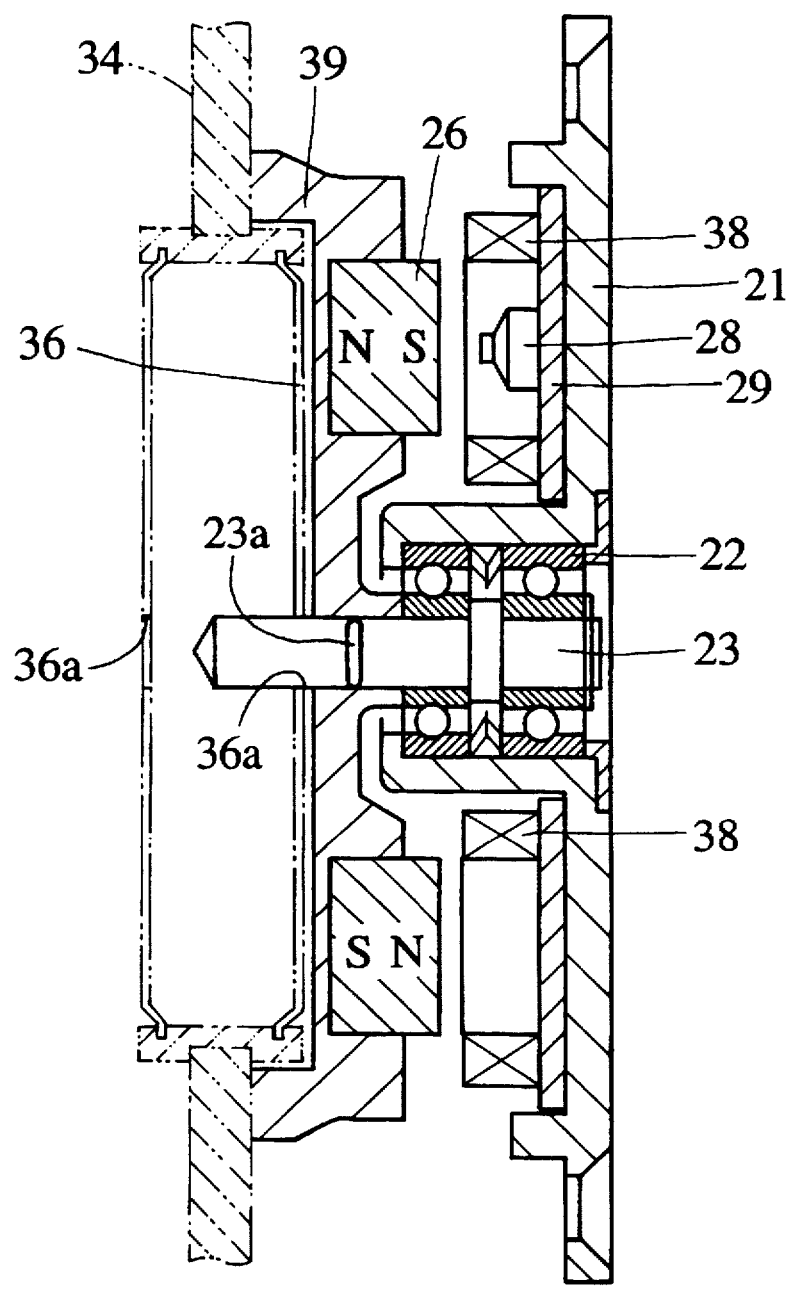
FIG. 4 is a sectional view of the conventional motor.

The above stator coil 6 is composed of a platy sheet coil, so that a land can be formed for mounting the hole element 11. Therefore, no circuit board is required. FIG. 3 shows this stator coil 6, in which a plurality of coil sections 6a are radially arranged. The stator coil 6 is fabricated in the following manner. Illustratively, a plurality of coils 6a of substantially sectorial shape are formed on a surface of a thin substrate composed of an insulator in equal pitches by, for example, plating as shown in FIG. 3. The plurality of coils 6a are formed in two layers with an insulating layer interposed therebetween.

The above coils 6a are coated with an insulator of epoxy resin to thereby form a platy sheet coil for use as the stator coil 6. The back of the above substrate is provided with a land for mounting the hole element 11 and lands for wiring to the plurality of coils 6a by printing. Although the above stator coil 6 composed of the sheet coil is thin as compared with the conventional coil of wound wire, its current density is so high that the torque generated per volume can be high to thereby enable reduction of the thickness of the motor as a whole.

Each coil 6a consists of parts A, C arranged along the circumference and part B arranged along the diameter as shown in FIG. 3. The torque is generated by the part B arranged along the diameter. Thus, the torque increase is effected by causing the diameter of the part A to be greater than that of the field magnet 5 to thereby increase the length of the part B capable of effectively generating the torque.

In this embodiment, all or part of the stator coil 6 has an outer diameter set larger than that of the field magnet 5 of the rotor. This strengthens the rotating magnetic field for driving the rotor, so that advantageously the output of the torque for the whole body of the motor can be increased.

The operation of the motor of the above structure according to the present invention will be described below.

First, the disk 12 is mounted on the motor from above the rotary shaft 8 of the motor. The magnetic flux from the field magnet 5 magnetically attracts the clamping yoke 13 of the disk 12 and the lower side of the disk 12 is brought into contact with the protrusion 3a of the rotary frame 3, so that the disk 12 is secured to a given position of the motor. Then, when current is fed to the stator coil 6 by a control power source not shown, the hole element 11 detects the position of the magnetic pole of the field magnet 5 and outputs control signal. Passing control current through the stator coil 6 in accordance with this control signal generates torque in cooperation with the magnetic flux from the field magnet 5, so that the motor rotates in a given direction.

What is claimed is:

1. A disk driving motor comprising:
 a stator coil secured to a bracket,
 a rotary shaft rotatably secured to the bracket, and
 a rotor secured to the rotary shaft and adapted to rotate simultaneously with the rotary shaft, said rotor comprising:

a rotary frame composed of a nonmagnetic material and adapted to detachably support a disk having a clamping yoke.

a field magnet having a diameter larger than that of the clamping yoke of the disk, said field magnet being arranged on the rotary frame to apply a clamping magnetic force to the clamping yoke of the disk and positioned opposite the stator coil to produce a rotating magnet field between the field magnet and the stator coil, and a cup-shaped magnetic material yoke having an opening with a diameter larger than that of the clamping yoke of the disk, said cup-shaped magnetic material yoke having the rotary frame disposed at the opening thereof, and said cup-shaped magnetic material yoke integrally covering a surface of the field magnet opposite the disk, except a portion of said surface magnet opposite the disk, except a portion of said surface corresponding to the opening, and a circumferential surface of the field magnet, said circumferential surface being parallel to an axial direction of the rotary shaft.

2. The disk driving motor according to claim 1, wherein said rotary frame of the rotor is provided with an auxiliary yoke so that the stator coil is interposed between said auxiliary yoke and the field magnet.

3. The disk driving motor according to claim 1, wherein the stator coil is shaped into a plate, part or all of which has a diameter larger than an outer diameter of the field magnet of the rotor.

* * * * *